(12) United States Patent
Tanaka

(10) Patent No.: US 11,315,233 B2
(45) Date of Patent: Apr. 26, 2022

(54) LEARNING MODEL GENERATING DEVICE, AND TYPE IDENTIFICATION SYSTEM FOR GENERATING LEARNING MODEL AND USING GENERATED LEARNING MODEL TO INFER TYPE OF IMAGE DEFECT

(71) Applicant: KYOCERA Document Solutions Inc., Osaka (JP)

(72) Inventor: Kazunori Tanaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 314 days.

(21) Appl. No.: 16/692,275

(22) Filed: Nov. 22, 2019

(65) Prior Publication Data
US 2020/0175672 A1    Jun. 4, 2020

(30) Foreign Application Priority Data
Nov. 29, 2018    (JP) .............................. JP2018-224021

(51) Int. Cl.
*G06T 7/00* (2017.01)
*G06T 7/11* (2017.01)
(Continued)

(52) U.S. Cl.
CPC .............. *G06T 7/0004* (2013.01); *G06T 7/11* (2017.01); *H04N 1/00005* (2013.01);
(Continued)

(58) Field of Classification Search
CPC ..................... G06T 7/0004; G06T 7/11; G06T 2207/20081; G06T 2207/30144;
(Continued)

(56) References Cited

U.S. PATENT DOCUMENTS

| 2014/0072242 A1* | 3/2014 | Wei ...................... H04N 19/865 382/299 |
| 2016/0026865 A1* | 1/2016 | Reynolds, Jr. .......... G06T 7/593 382/103 |

(Continued)

FOREIGN PATENT DOCUMENTS

| JP | 2017-076289 A | 4/2017 |
| JP | 2018-120300 A | 8/2018 |

*Primary Examiner* — Jerome Grant, II
(74) *Attorney, Agent, or Firm* — IP Business Solutions, LLC

(57) ABSTRACT

A learning model generating device includes a first image reading device and a first control device. The first control device includes a processor and functions, through the processor executing a first control program, as a first segmenter, a learning model generator, and a first compressor. The first segmenter segments each of images of training prints obtained by reading performed by the first image reading device. The learning model generator learns segmented images to generate a first learning model for use in inferring a type of an image defect. The first compressor compresses each of the images of the training prints. The first segmenter segments each of compressed images obtained by compression performed by the first compressor. The learning model generator learns compressed and segmented images to generate a second learning model for use in inferring a type of an image defect.

7 Claims, 7 Drawing Sheets

(51) Int. Cl.
*H04N 1/411* (2006.01)
*H04N 1/00* (2006.01)

(52) U.S. Cl.
CPC ....... *H04N 1/00037* (2013.01); *H04N 1/4115* (2013.01); *G06T 2207/20081* (2013.01); *G06T 2207/30144* (2013.01)

(58) Field of Classification Search
CPC ...... G06T 2207/20084; H04N 1/00005; H04N 1/00037; H04N 1/4115; H04N 1/409; G06K 9/03; G06K 9/6262; G06K 9/6271
USPC ........................................................ 382/112
See application file for complete search history.

(56) References Cited

U.S. PATENT DOCUMENTS

| | | |
|---|---|---|
| 2018/0211374 A1 | 7/2018 | Tanaka et al. |
| 2020/0082508 A1* | 3/2020 | Alletto ..................... G06N 3/08 |
| 2020/0175672 A1* | 6/2020 | Tanaka ............... H04N 1/00037 |
| 2020/0324842 A1* | 10/2020 | Chuang ...................... B62J 7/06 |
| 2020/0357112 A1* | 11/2020 | Sakai ........................ G06T 7/75 |
| 2021/0073972 A1* | 3/2021 | Wu ........................ G06T 7/174 |
| 2021/0183037 A1* | 6/2021 | Kurita ....................... G06T 3/40 |
| 2021/0183052 A1* | 6/2021 | Ikeda .................... G06T 7/0004 |
| 2021/0233229 A1* | 7/2021 | Hyatt ................. G01N 21/8851 |
| 2021/0279520 A1* | 9/2021 | Ivanov ................. G06K 9/6273 |
| 2021/0318565 A1* | 10/2021 | Song ..................... G06T 7/0004 |
| 2021/0334946 A1* | 10/2021 | Buzaglo ................. G06T 7/001 |
| 2021/0342306 A1* | 11/2021 | Fang .................... H04L 9/3239 |

* cited by examiner

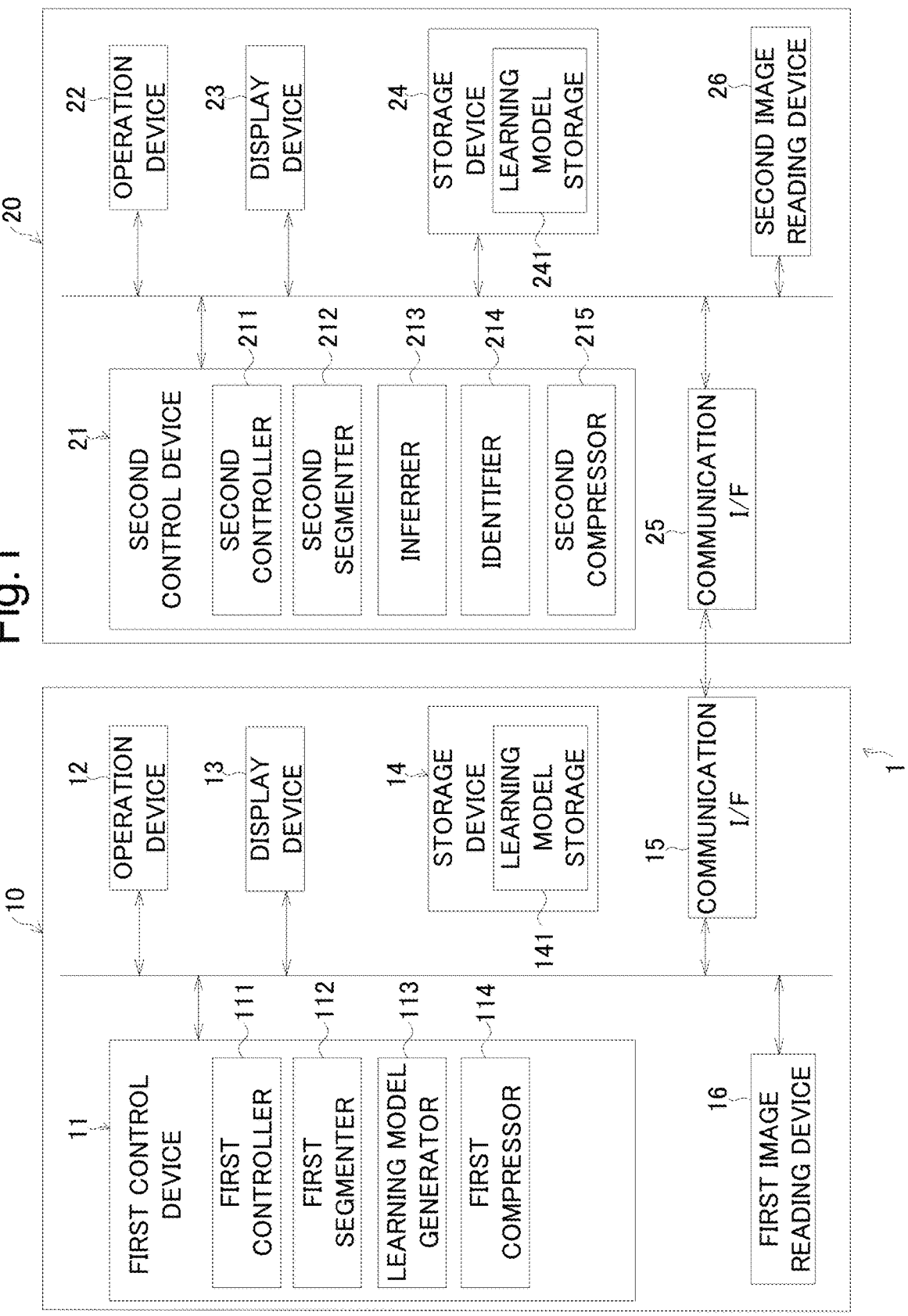

36 BLOCKS
(=6×6)

144 BLOCKS
(=12×12)

576 BLOCKS
(=24×24)

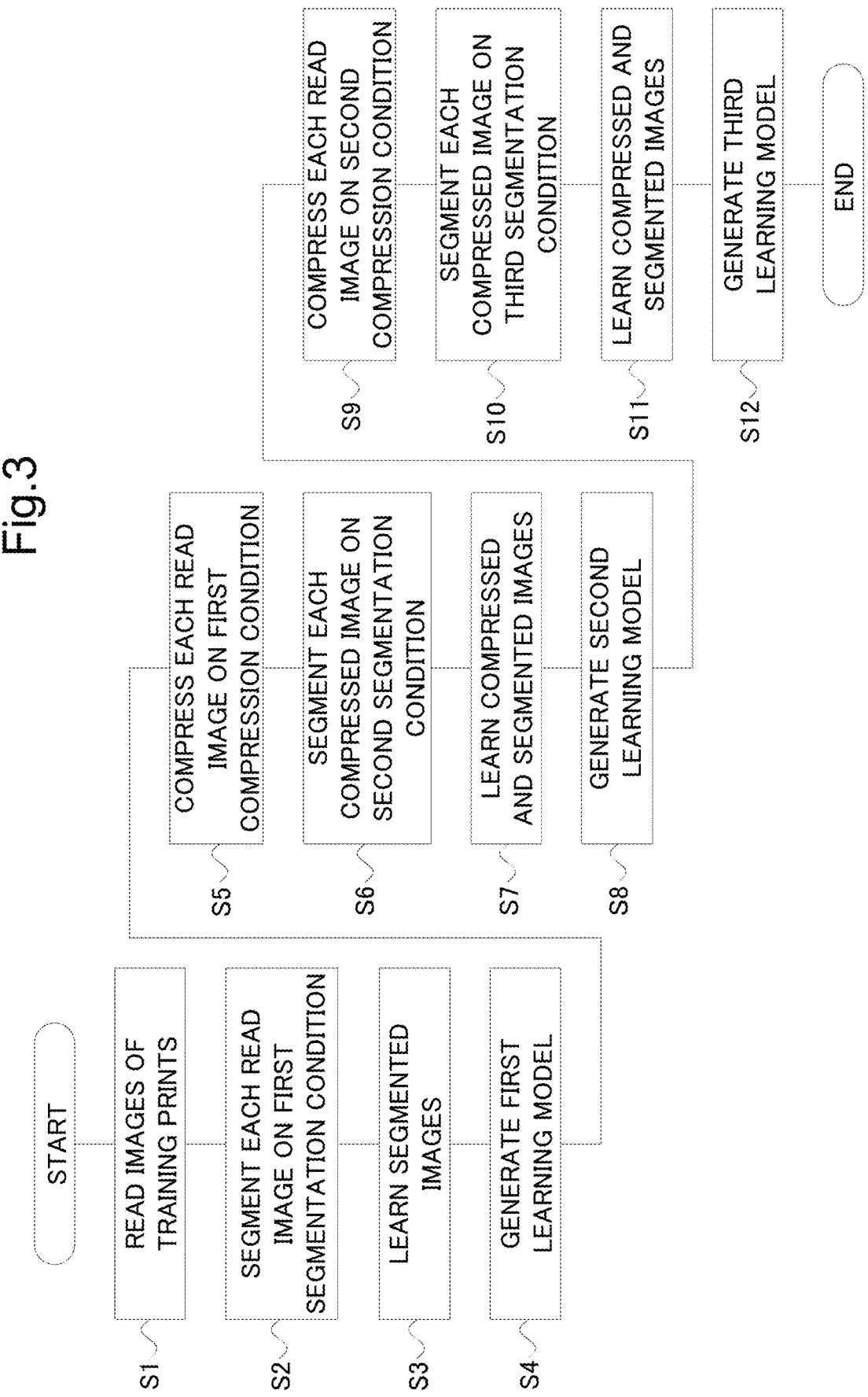

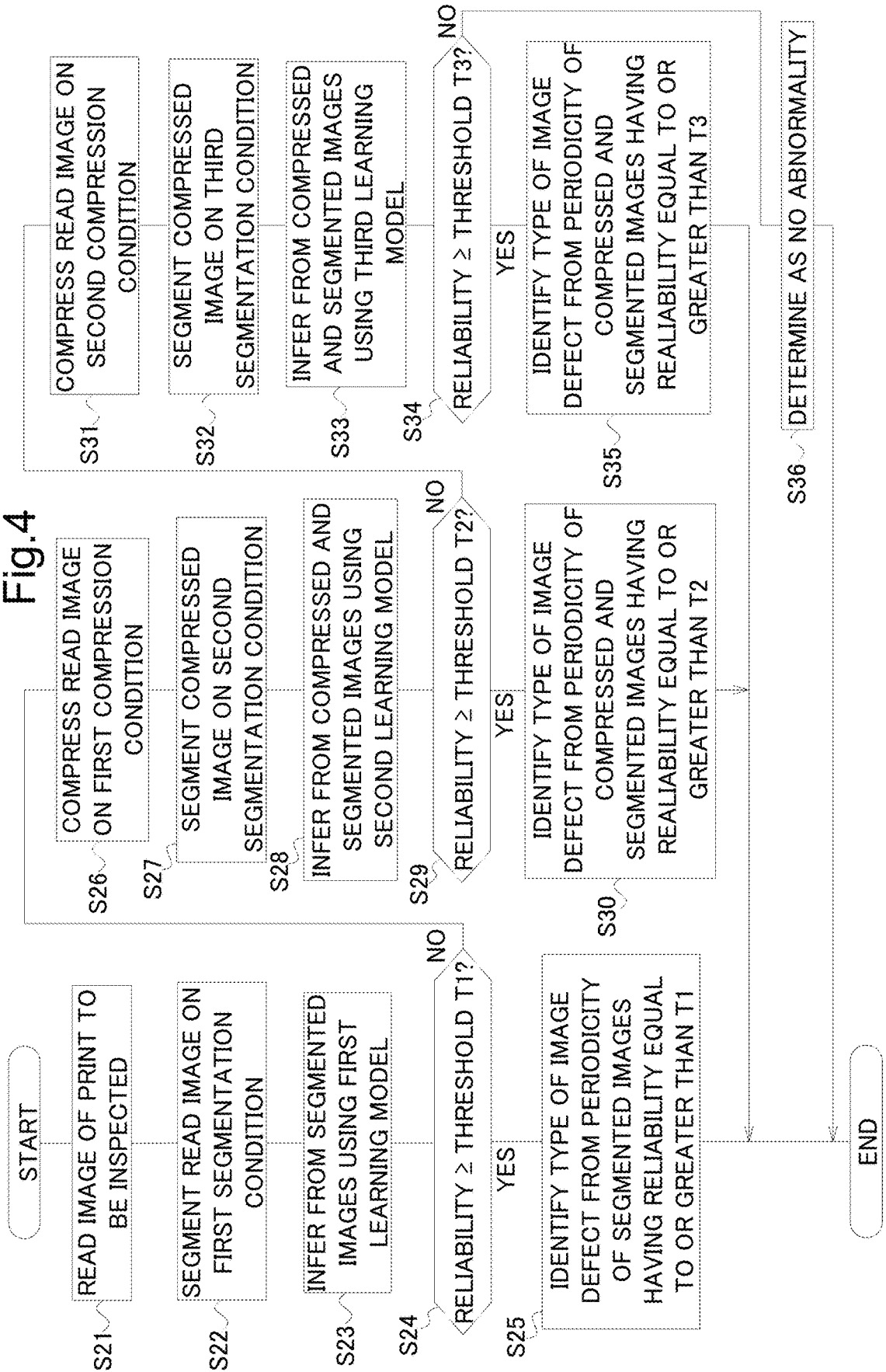

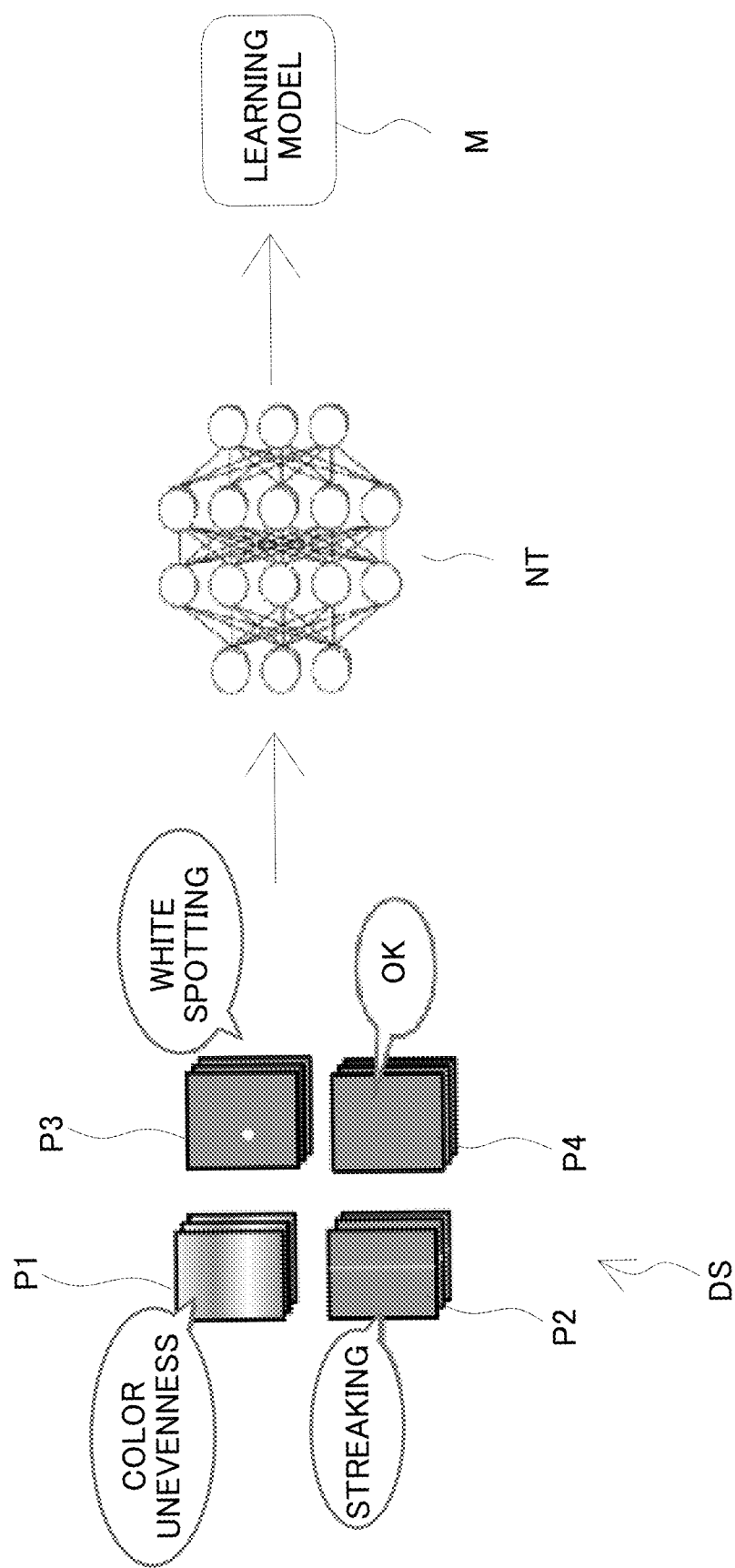

IMAGE WITH UNEVENNESS

PB

LEARNING MODEL GENERATING DEVICE, AND TYPE IDENTIFICATION SYSTEM FOR GENERATING LEARNING MODEL AND USING GENERATED LEARNING MODEL TO INFER TYPE OF IMAGE DEFECT

INCORPORATION BY REFERENCE

This application claims priority to Japanese Patent Application No. 2018-224021 filed on Nov. 29, 2018, the entire contents of which are incorporated by reference herein.

BACKGROUND

The present disclosure relates to learning model generating devices, type identification systems, and methods for generating learning models and particularly relates to a technique for generating a learning model and using the generated learning model to infer the type of an image defect.

Recently, at production sites and the like, a mechanism is being introduced for automating appearance inspection and so on of products using artificial intelligence or deep learning.

SUMMARY

A technique improved over the above technique is proposed as one aspect of the present disclosure.

A learning model generating device according to one aspect of the present disclosure is a learning model generating device capable of learning a data set containing image defect-containing training prints prepared for each type of image defect to generate a learning model and includes a first image reading device and a first control device. The first image reading device reads images of the training prints. The first control device includes a processor and functions, through the processor executing a first control program, as a first segmenter, a learning model generator, and a first compressor. The first segmenter segments, on a predetermined first segmentation condition, each of the images of the training prints obtained by reading performed by the first image reading device. The learning model generator learns segmented images obtained by segmentation performed by the first segmenter to generate a first learning model for use in inferring a type of an image defect. The first compressor compresses, on a predetermined first compression condition, each of the images of the training prints obtained by reading performed by the first image reading device. In addition, the first segmenter segments, on a predetermined second segmentation condition, each of compressed images obtained by compression performed by the first compressor. The learning model generator learns compressed and segmented images obtained by compression performed by the first compressor and segmentation performed by the first segmenter to generate a second learning model for use in inferring a type of an image defect.

A type identification system according to one aspect of the present disclosure is a type identification system including the above-described learning model generating device and a type identification device. The type identification device uses the first learning model and the second learning model both generated by the learning model generating device to identify a type of an image defect contained on a print to be inspected. The type identification device includes a second image reading device and a second control device. The second image reading device reads an image of the print to be inspected. The second control device includes a processor and functions, through the processor executing a second control program, as a second segmenter, an inferrer, and a second compressor. The second segmenter segments, on the same segmentation condition as the first segmentation condition, the image of the print to be inspected obtained by reading performed by the second image reading device. The inferrer uses the first learning model to infer a type of an image defect to which each of segmented images obtained by segmentation performed by the second segmenter applies. The second compressor compresses, on the same compression condition as the first compression condition, the image of the print to be inspected. In addition, the second segmenter segments, on the same segmentation condition as the second segmentation condition, a compressed image obtained by compression performed by the second compressor. The inferrer uses the second learning model to infer a type of an image defect to which each of compressed and segmented images obtained by compression performed by the second compressor and segmentation performed by the second segmenter applies.

A method for generating a learning model according to one aspect of the present disclosure is a method for generating a learning model by learning a data set containing image defect-containing training prints prepared for each type of image defect and includes an image reading step, a segmentation step, a learning model generating step, and a compression step. In the image reading step, images of the training prints are read. In the segmentation step, each of the images of the training prints obtained by reading in the image reading step is segmented on a predetermined first segmentation condition. In the learning model generating step, segmented images obtained by segmentation in the segmentation step are learned to generate a first learning model for use in inferring a type of an image defect. In the compression step, each of the images of the training prints is compressed on a predetermined first compression condition. In addition, in the segmentation step, each of compressed images obtained by compression in the compression step is segmented on a predetermined second segmentation condition. In the learning model generating step, compressed and segmented images obtained by compression in the compression step and segmentation in the segmentation step are learned to generate a second learning model for use in inferring a type of an image defect.

BRIEF DESCRIPTION OF THE DRAWINGS

FIG. 1 is a functional block diagram schematically showing an essential internal configuration of a type identification system made up by including a learning model generating device and a type identification device each according to an embodiment of the present disclosure.

FIG. 3 is a flowchart showing an example of a sequence of processing operations executed by a first control device in the learning model generating device.

FIG. 4 is a flowchart showing an example of a sequence of processing operations executed by a second control device in the type identification device.

FIG. 5 is a diagram for illustrating a flow of generation of a learning model.

DETAILED DESCRIPTION

Figure 2C:
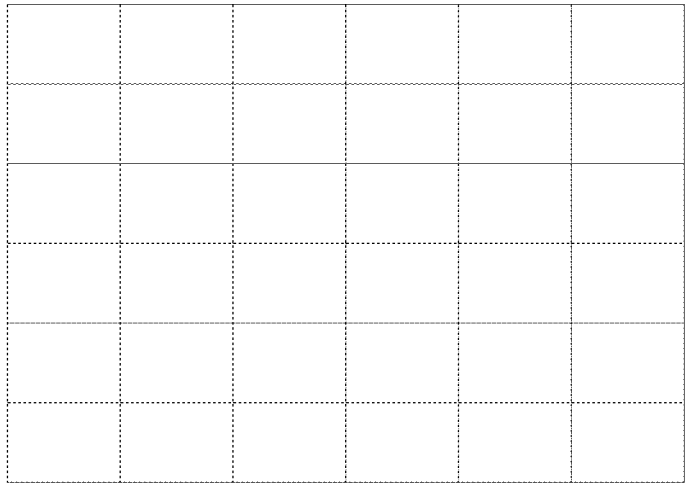
FIGS. 2A, 2B, and 2C are diagrams each for illustrating image regions of segmented images.

Hereinafter, a description will be given of a learning model generating device, a type identification device, a method for generating a learning model, and a type identification system all according to one embodiment of the present disclosure with reference to the drawings. FIG. 1 is a functional block diagram schematically showing an essential internal configuration of the type identification system made up by including the learning model generating device and the type identification device each according to the one embodiment. The type identification system 1 is made up by including the learning model generating device 10 and the type identification device 20. The learning model generating device 10 generates a first learning model and a second learning model both of which will be described later. The type identification device 20 uses the first learning model and the second learning model both generated by the learning model generating device 10 to identify the type of an image defect contained on a print to be inspected.

The learning model generating device 10 includes a first control device 11, an operation device 12, a display device 13, a storage device 14, a communication interface device (communication I/F) 15, and a first image reading device 16.

The operation device 12 is composed of a keyboard, a mouse, and so on and used to input commands and characters to the first control device 11 and operate a pointer on the screen of the display device 13. The display device 13 is a display device, such as a liquid crystal display, and displays a response or a data result from the first control device 11.

The storage device 14 is a storage device, such as an HDD (hard disk drive), stores programs, including a first control program necessary for the operation of the learning model generating device 10, and data, and includes a learning model storage 141 for storing learning models.

The communication interface device 15 is an interface including an unshown communication module, such as a LAN (local area network) chip, and communicates with external devices. The learning model generating device 10 transfers data to and from the type identification device 20 via the communication interface device 15.

The first image reading device 16 includes a scanning mechanism (not shown) including a lighting part, a CCD (charge coupled device) sensor, and so on and optically reads, under the control of a first controller 111 constituting part of the first control device 11, an image of a document (a training print in this case) placed on an original glass plate (not shown). The reading of an image is performed at the maximum resolution (for example, 600 dpi) readable by the first image reading device 16.

For example, when the first image reading device 16 reads a training print of A3 size (297 mm×210 mm) at a resolution of 600 dpi, an image obtained by reading by the first image reading device 16 is composed of "9921×7016 pixels". Examples of the training prints include prints constituted of sets of prints P1 to P4 shown in FIG. 5.

The first control device 11 is made up by including a processor, a RAM (random access memory), a ROM (read only memory), and a dedicated hardware circuit. The processor is, for example, a CPU (central processing unit), an ASIC (application specific integrated circuit), an MPU (micro processing unit) or a GPU (graphic processing unit). The first control device 11 includes the first controller 111, a first segmenter 112, a learning model generator 113, and a first compressor 114.

The first control device 11 functions as the first controller 111, the first segmenter 112, the learning model generator 113, and the first compressor 114 by operation of the processor in accordance with a first control program stored in the storage device 14. However, each of the above components, such as the first controller 111, may not be implemented by the operation of the first control device 11 in accordance with the first control program, but may be constituted by a hardware circuit. Hereinafter, the same applies to the other embodiments unless otherwise stated.

The first controller 111 governs the overall operation control of the learning model generating device 10. The first controller 111 is connected to the operation device 12, the display device 13, the storage device 14, the communication interface device 15, and the first image reading device 16, controls the operations of these connected components, and transfers signals or data to and from these components.

Figure 2B:
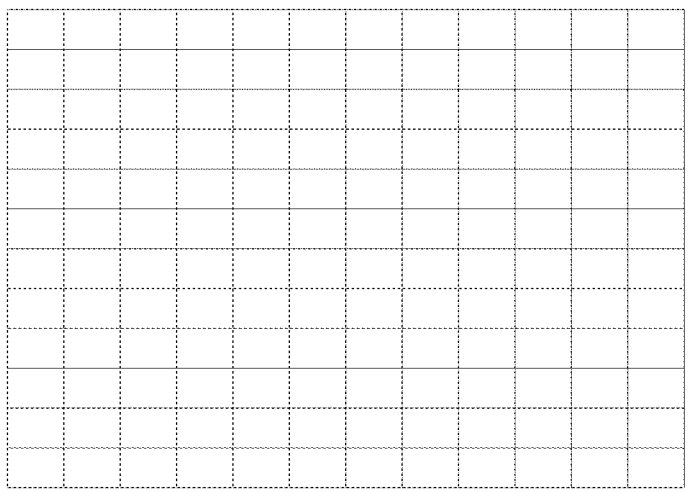
Figure 2A:
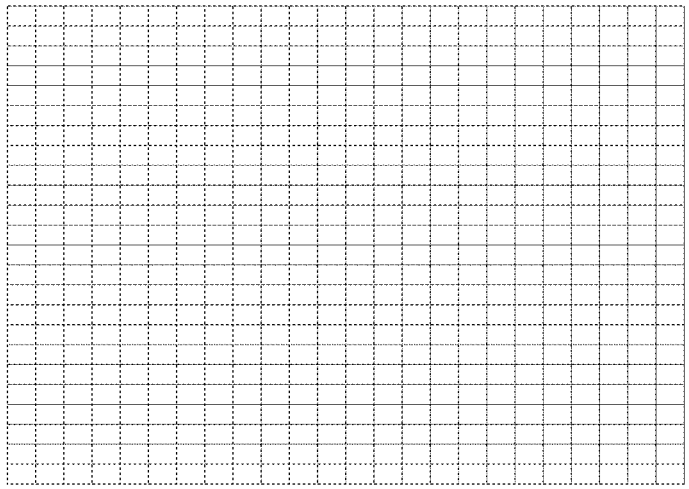

The first segmenter 112 segments, on a predetermined first segmentation condition, each of the images of training prints obtained by reading performed by the first image reading device 16. For example, if the first segmentation condition is set to segmentation of an image in units of "a×b pixels", an image composed of "24a×24b pixels" is segmented into 576 (=24×24) blocks of images as shown in FIG. 2A.

The learning model generator 113 learns the segmented images obtained by the segmentation performed by the first segmenter 112 to generate a first learning model for use in inferring the type of an image defect and allows the learning model storage 141 to store the generated learning model. For example, the learning model generator 113 learns, in a neural network, segmented images obtained by segmenting each of images of sets of prints P1 to P4 shown in FIG. 5 to generate a learning model in which respective features of the segmented images are stored.

Figure 6:
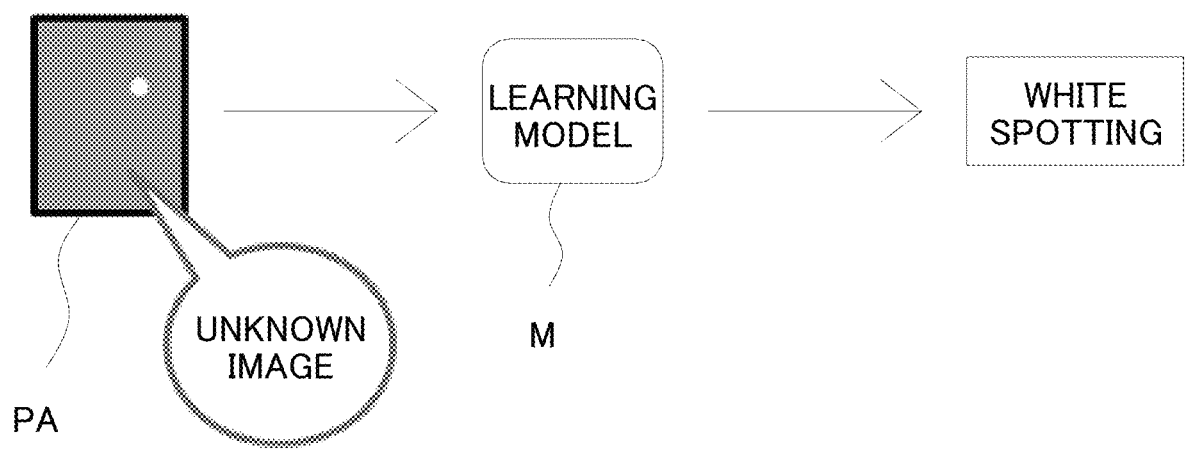
FIG. 6 is a diagram for illustrating a flow of inference of an appropriate output from an unknown input using the learning model.

The learning model generator 113 learns a large number of images serving as a data set in the above manner and thus can generate a learning model enabling the inference of an appropriate "output" from an unknown "input" as shown in FIG. 6. In FIG. 5, "color unevenness", "streaking", and "white spotting" are cited as types of image defects. However, the types of image defects are not limited to these types and other examples include "scratch-like defect" and "black spotting".

The first compressor 114 compresses, on a predetermined first compression condition, each of the images of the training prints obtained by reading performed by the first image reading device 16. For example, if the first compression condition is set at a compression ratio of 50%, an image composed of "24a×24b pixels" is compressed into an image composed of "12a×12b pixels".

As will be described later in details, the first segmenter 112 also segments each of compressed images of the training prints obtained by the compression performed by the first compressor 114, and the learning model generator 113 also learns compressed and segmented images of the training prints obtained by the compression performed by the first compressor 114 and the subsequent segmentation performed by the first segmenter 112.

The type identification device 20 includes a second control device 21, an operation device 22, a display device 23, a storage device 24, a communication interface device (communication I/F) 25, and a second image reading device 26.

The operation device 22 is composed of a keyboard, a mouse, and so on and used to input commands and characters to the second control device 21 and operate a pointer on the screen of the display device 23. The display device 23 displays a response or a data result from the second control device 21.

The storage device 24 is a storage device, such as an HDD, stores programs, including a second control program necessary for the operation of the type identification device 20, and data, and includes a learning model storage 241 for storing learning models.

The communication interface device 25 is an interface including an unshown communication module, such as a LAN chip, and communicates with external devices. The type identification device 20 transfers data to and from the learning model generating device 10 via the communication interface device 25.

The second image reading device 26 includes a scanning mechanism (not shown) including a lighting part, a CCD sensor, and so on and optically reads, under the control of a second controller 211 constituting part of the second control device 21, an image of a document (a print to be inspected in this case) placed on an original glass plate (not shown). The reading of an image is performed at the maximum resolution (for example, 600 dpi) readable by the second image reading device 26. The print to be inspected is, for example, a print output from a printer, a multifunction peripheral or the like at a production site and is used to inspect the printer, the multifunction peripheral or the like.

The second control device 21 is made up by including a processor, a RAM, a ROM, and a dedicated hardware circuit. The processor is, for example, a CPU, an ASIC, an MPU or a GPU. The second control device 21 includes the second controller 211, a second segmenter 212, an inferrer 213, an identifier 214, and a second compressor 215.

The second control device 21 functions as the second controller 211, the second segmenter 212, the inferrer 213, the identifier 214, and the second compressor 215 by operation of the processor in accordance with a second control program stored in the storage device 24. However, each of the above components, such as the second controller 211, may not be implemented by the operation of the second control device 21 in accordance with the second control program, but may be constituted by a hardware circuit. Hereinafter, the same applies to the other embodiments unless otherwise stated.

The second controller 211 governs the overall operation control of the type identification device 20. The second controller 211 is connected to the operation device 22, the display device 23, the storage device 24, the communication interface device 25, and the second image reading device 26, controls the operations of these connected components, and transfers signals or data to and from these components.

The second segmenter 212 segments, on the same segmentation condition as the first segmentation condition (i.e., the segmentation condition used by the learning model generating device 10 in generating the first learning model), the image of the print to be inspected obtained by reading performed by the second image reading device 26.

The inferrer 213 uses the first learning model to determine the type of an image defect to which each of segmented images of the print obtained by the segmentation performed by the second segmenter 212 applies, considers the determination result as an inference result, and outputs the reliability of the inference result to the identifier 214. For example, the inferrer 213 outputs to the identifier 214 a quantified reliability of an inference result on the type of an image defect, indicating that the probability of "white spotting" is "99%", the probability of "streaking" is "0.5%", and the probability of "scratch-like defect" is "0.5%".

The identifier 214 determines, based on the inference results of the inferrer 213, whether or not any image defect occurs on the print to be inspected, and, on the occurrence of an image defect, identifies the type of the image defect.

When determining that the reliabilities output from the inferrer 213 include a reliability equal to or greater than a predetermined threshold value (for example, 50%), the identifier 214 adopts the inference result indicating the reliability to identify the type of the image defect contained on the print to be inspected. On the other hand, when determining that the reliabilities output from the inferrer 213 include no reliability equal to or greater than the above threshold value (in other words, when none of the segmented images shows a value equal to or greater than the threshold value indicating abnormality), the identifier 214 determines that the print to be inspected has no abnormality.

In relation to the reliability, it is conceivable that the inference results regarding a print to be inspected suggest the possibility that there are different types of image defects represented by reliabilities equal to or greater than the threshold value and thus the exact type of an image defect becomes difficult to identify. For example, it is conceivable that the inference result on the type of an image defect to which a segmented image applies indicates that the probability of "white spotting" is "56%", while the inference result on the type of an image defect to which another segmented image applies indicates that the probability of "streaking" is "58%".

In such a case, the identifier 214 identifies, based on the inference results of the inferrer 213, the type of an image defect contained on the print to be inspected from the periodicity with which segmented images indicated as having an image defect appear on the print to be inspected.

For example, in the case where the image defect is "streaking", the segmented images indicated as having an image defect by inference results appear with a constant period. In the case where the image defect is "white spotting", the segmented images indicated as having an image defect by inference results are concentrated in an area. Therefore, it is possible to identify, from the periodicity with which segmented images indicated as having an image defect by inference results appear on the print to be inspected, the type of an image defect contained on the print to be inspected.

The second compressor 215 compresses, on the same compression condition as the first compression condition (i.e., the compression condition used by the learning model generating device 10 in generating the second learning model), the image of the print to be inspected obtained by reading performed by the second image reading device 26.

As will be described later in details, the second segmenter 212 also segments the compressed image of the print to be inspected obtained by the compression performed by the second compressor 215, and the inferrer 213 also infers the type of an image defect to which each of compressed and segmented images of the print to be inspected obtained by the compression performed by the second compressor 215 and the subsequent segmentation performed by the second segmenter 212 applies.

Next, a description will be given of an example of a sequence of processing operations executed by the first control device 11 in the learning model generating device 10, with reference to a flowchart shown in FIG. 3. This sequence of processing operations is a sequence of processing operations to be performed when the first controller 111 accepts, through the operation device 12, a user's instruction to read training prints.

First, the first controller 111 allows the first image reading device 16 to read images of training prints (S1), the first segmenter 112 segments, on the first segmentation condition, each of the images of the training prints obtained by the reading performed by the first image reading device 16 (S2), and the learning model generator 113 learns segmented images obtained by the segmentation performed by the first segmenter 112 (S3) to generate a first learning model for use in inferring a type of an image defect (S4).

As described previously, if the first segmentation condition is set to segmentation of an image in units of "a×b pixels", an image composed of "24a×24b pixels" subjected to the segmentation is segmented into 576 (=24×24) blocks of images as shown in FIG. 2A. Such uncompressed segmented images have small image regions as shown in FIG. 2A. Therefore, the first learning model generated by learning of uncompressed segmented images is suitable for detection of high-frequency abnormalities.

Subsequently, the first compressor 114 compresses, on the first compression condition, each of the images of the training prints obtained by the reading performed by the first image reading device 16 (S5), the first segmenter 112 segments, on a predetermined second segmentation condition, each of compressed images of the training prints obtained by the compression performed by the first compressor 114 (S6), and the learning model generator 113 learns compressed and segmented images of the training prints obtained by the compression by the first compressor 114 and the subsequent segmentation by the first segmenter 112 (S7) to generate a second learning model for use in inferring the type of an image defect (S8).

For example, if the first compression condition is set at a compression ratio of 50%, an image composed of "24a×24b pixels" is compressed into an image composed of "12a×12b pixels".

The second segmentation condition may be the same as the first segmentation condition. If the second segmentation condition is set to segmentation of an image in units of "a×b pixels", an image composed of "12a×12b pixels" subjected to the segmentation is segmented into 144 (=12×12) blocks of images as shown in FIG. 2B. Such compressed and segmented images have slightly larger image regions than the uncompressed segmented images, as shown in FIG. 2B. Therefore, the second learning model generated by learning of compressed and segmented images is suitable for detection of low-frequency abnormalities.

Subsequently, the first compressor 114 compresses, on a predetermined second compression condition different from the first compression condition, each of the images of the training prints obtained by the reading performed by the first image reading device 16 (S9), the first segmenter 112 segments, on a predetermined third segmentation condition, each of compressed images of the training prints obtained by the compression on the second compression condition performed by the first compressor 114 (S10), the learning model generator 113 learns compressed and segmented images of the training prints obtained by the compression on the second compression condition by the first compressor 114 and the subsequent segmentation by the first segmenter 112 (S11) to generate a third learning model for use in inferring the type of an image defect (S12), and then the first control device 11 ends this sequence of processing operations.

For example, if the second compression condition is set at a compression ratio of 25%, an image composed of "24a×24b pixels" is compressed into an image composed of "6a×6b pixels".

The third segmentation condition may be the same as the first segmentation condition. If the third segmentation condition is set to segmentation of an image in units of "a×b pixels", an image composed of "6a×6b pixels" subjected to the segmentation is segmented into 36 (=6×6) blocks of images as shown in FIG. 2C. Such compressed and segmented images obtained at a large compression ratio have larger image regions than the compressed and segmented images obtained at a small compression ratio, as shown in FIG. 2C. Therefore, the third learning model generated by learning of compressed and segmented images obtained at a large compression ratio is more suitable for detection of low-frequency abnormalities.

The description in S9 has been given of the case where the first compressor 114 compresses each of the images of the training prints on the second compression condition different from the first compression condition. Instead of this, the first compressor 114 may further compress, on a predetermined third compression condition, each of the compressed images obtained by the compression in S5. For example, the compressed images obtained by compression at a compression ratio of 50% (i.e., on the first compression condition) in S5 may be further compressed at a compression ratio of 50% in S9. Subsequently, the above processing tasks in S10 to S12 are executed. Specifically, the first segmenter 112 segments, on the predetermined third segmentation condition, each of compressed images of the training prints obtained by the compression on the third compression condition performed by the first compressor 114 (S10), the learning model generator 113 learns compressed and segmented images of the training prints obtained by the compression on the third compression condition by the first compressor 114 and the subsequent segmentation by the first segmenter 112 (S11) to generate a third learning model for use in inferring the type of an image defect (S12), and then the first control device 11 ends this sequence of processing operations.

Next, a description will be given of an example of a sequence of processing operations executed by the second control device 21 in the type identification device 20, with reference to a flowchart shown in FIG. 4. This sequence of processing operations is a sequence of processing operations to be performed when the second control device 211 accepts, through the operation device 22, a user's instruction to read a print to be inspected.

First, the second controller 211 allows the second image reading device 26 to read an image of a print to be inspected (S21), the second segmenter 212 segments, on the first segmentation condition (used by the learning model generating device 10 in generating the first learning model), the image of the print to be inspected obtained by the reading performed by the second image reading device 26 (S22), and the inferrer 213 uses the first learning model to infer the type of an image defect to which each of segmented images obtained by the segmentation performed by the second segmenter 212 applies, and outputs the reliabilities of the inference results to the identifier 214 (S23).

The identifier 214 determines whether or not there is any reliability equal to or greater than a predetermined threshold value T1 among the reliabilities input from the inferrer 213 (S24). When determining that there is any reliability equal to or greater than the threshold value T1 (YES in S24), the identifier 214 identifies, based on the inference results of the inferrer 213, the type of an image defect contained on the print to be inspected from the periodicity with which segmented images indicated as having an image defect appear on the print to be inspected (S25), and then this sequence of processing operations is ended.

By checking the above periodicity of appearance on the print to be inspected, the exact type of an image defect can be identified even if the inference results regarding the print to be inspected suggest that the print contains a plurality of types of image defects represented by reliabilities equal to or greater than the threshold value T1. Furthermore, even if the inference results show that the print to be inspected contains only one type of image defect represented by reliabilities equal to or greater than the threshold value T1, this does not necessarily result in identification of an origin (cause) of the defect. For example, if there are "black spots" caused by a drum unit or "black spots" derived from some kind of dust on a print to be inspected, the origin of the image defect may not be able to be identified by looking at an individual black spot, but can be identified by checking the periodicity of appearance of the black spots.

When, in S24, the identifier 214 determines that there is no reliability equal to or greater than the threshold value T1 among the reliabilities input from the inferrer 213 (that is, none of the segmented images obtained by the segmentation in S22 shows a value equal to or greater than the threshold value T1 indicating abnormality) (NO in S24), the second compressor 215 compresses, on the first compression condition (used by the learning model generating device 10 in generating the second learning model), the image of the print to be inspected obtained by the reading performed by the second image reading device 26 (S26).

Subsequently, the second segmenter 212 segments, on the second segmentation condition (used by the learning model generating device 10 in generating the second learning model), a compressed image obtained by the compression performed by the second compressor 215 (S27), and the inferrer 213 uses the second learning model to infer the type of an image defect to which each of compressed and segmented images obtained by the compression performed by the second compressor 215 and the subsequent segmentation performed by the second segmenter 212 applies, and outputs the reliabilities of the inference results to the identifier 214 (S28).

The identifier 214 determines whether or not there is any reliability equal to or greater than a predetermined threshold value T2 among the reliabilities input from the inferrer 213 (S29). When determining that there is any reliability equal to or greater than the threshold value T2 (YES in S29), the identifier 214 identifies, based on the inference results of the inferrer 213, the type of an image defect contained on the print to be inspected from the periodicity with which compressed and segmented images indicated as having an image defect appear on the print to be inspected (S30), and then this sequence of processing operations is ended.

By checking the above periodicity of appearance on the print to be inspected, the exact type of an image defect can be identified even if the inference results regarding the print to be inspected suggest that the print contains a plurality of types of image defects represented by reliabilities equal to or greater than the threshold value T2. In addition, the origin of an image defect which cannot be identified by looking at an individual defective site can be identified by checking the periodicity of appearance of defective sites.

When, in S29, the identifier 214 determines that there is no reliability equal to or greater than the threshold value T2 among the reliabilities input from the inferrer 213 (that is, none of the compressed and segmented images obtained by the segmentation in S27 shows a value equal to or greater than the threshold value T2 indicating abnormality) (NO in S29), the second compressor 215 compresses, on the second compression condition (used by the learning model generating device 10 in generating the third learning model), the image of the print to be inspected obtained by the reading performed by the second image reading device 26 (S31).

Subsequently, the second segmenter 212 segments, on the third segmentation condition (used by the learning model generating device 10 in generating the third learning model), a compressed image obtained by the compression performed by the second compressor 215 (S32), and the inferrer 213 uses the third learning model to infer the type of an image defect to which each of compressed and segmented images obtained by the compression performed by the second compressor 215 and the subsequent segmentation performed by the second segmenter 212 applies, and outputs the reliabilities of the inference results to the identifier 214 (S33).

The identifier 214 determines whether or not there is any reliability equal to or greater than a predetermined threshold value T3 among the reliabilities input from the inferrer 213 (S34). When determining that there is any reliability equal to or greater than the threshold value T3 (YES in S34), the identifier 214 identifies, based on the inference results of the inferrer 213, the type of an image defect contained on the print to be inspected from the periodicity with which compressed and segmented images indicated as having an image defect appear on the print to be inspected (S35), and then this sequence of processing operations is ended.

By checking the above periodicity of appearance on the print to be inspected, the exact type of an image defect can be identified even if the inference results regarding the print to be inspected suggest that the print contains a plurality of types of image defects represented by reliabilities equal to or greater than the threshold value T3. In addition, the origin of an image defect which cannot be identified by looking at an individual defective site can be identified by checking the periodicity of appearance of defective sites.

When, in S34, the identifier 214 determines that there is no reliability equal to or greater than the threshold value T3 among the reliabilities input from the inferrer 213 (that is, none of the compressed and segmented images obtained by the segmentation in S32 shows a value equal to or greater than the threshold value T3 indicating abnormality) (NO in S34), the identifier 214 determines that the print to be inspected has "no abnormality", i.e., no image defect, (S36), and then this sequence of processing operations is ended.

The description in S31 is given of the case where the second compressor 215 compresses the image of the print to be inspected on the second compression condition different from the first compression condition. Instead of this, the second compressor 215 may further compress, on a predetermined third compression condition, the compressed image obtained by the compression in S26. For example, the compressed image obtained by compression at a compression ratio of 50% (i.e., on the first compression condition) in S26 may be further compressed at a compression ratio of 50% in S31.

According to the above embodiment, the first learning model suitable for detection of high-frequency abnormalities and the second and third learning models suitable for detection of low-frequency abnormalities are generated. Therefore, both the high-frequency and low-frequency abnormalities (image defects) can be appropriately detected.

In addition, every image for use in generating the first to third learning models is in the form of segmented images. Therefore, even if the size of an image for use is large, the first to third learning models can be generated without increasing the processing load.

In using a print output from a printer to inspect the printer, first, a large amount of data set DS consisting of sets of prints P1 to P3 having image defects (for example, color unevenness, streaking, and white spotting) and a set of prints P4 having no image defect is prepared as shown in FIG. 5, and learning of the large amount of data set DS is performed in a neural network NN to generate a learning model M in which features of all the data are stored (a learning phase).

When such a large amount of data set DS including various types of data is learned in a neural network NN, a learning model M capable of inferring an appropriate "output" from an unknown "input" can be obtained. For example, when, as shown in FIG. 6, the type of an image defect on an unknown print PA not found in the data set DS is inferred using the learning model M, it can be determined that the print PA has an image defect of "white spotting" (an inference phase).

Leaning in a neural network involves arithmetic processing of a huge amount of data. Therefore, if the image size of a data set is too large, the data set is difficult to learn in a neural network.

In order to solve the above problem, it is necessary to reduce the image size of the data set. The following two methods for reducing the image size are considered. One of the methods is to subject the images of the data set to compression processing and perform learning of compressed images of the data set in a neural network. The other is to subject the images of the data set to segmentation processing and perform learning of segmented images of the data set in a neural network.

Figure 7B:
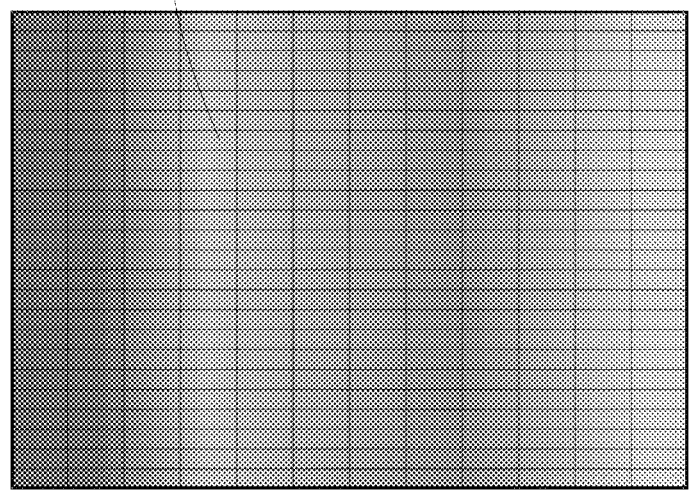
FIG. 7B is a view showing a state where the image formed on the print is segmented and showing a block of the image segmented.
Figure 7A:
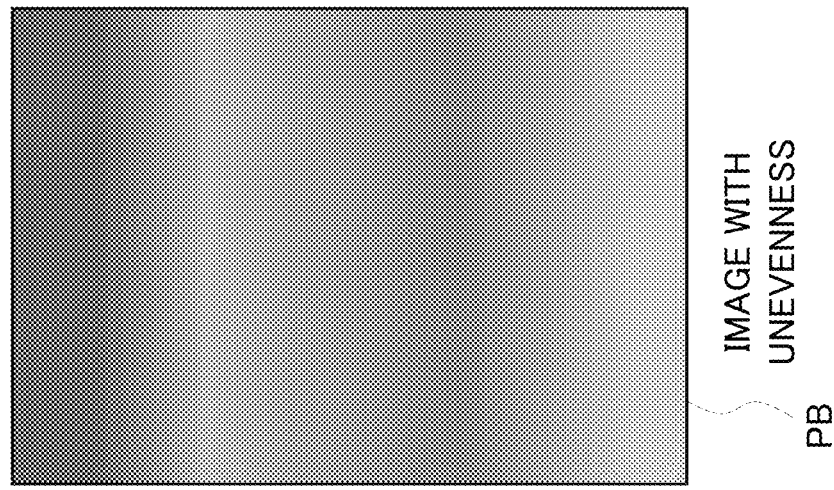
FIG. 7A is a view showing a print on which an image defect of color unevenness forms.

However, if an image is excessively compressed, high-frequency abnormalities (image defects), such as a small scratch-like defect, in the image may not be able to be found. On the other hand, if an image is segmented into excessively small regions, high-frequency abnormalities, such as scratch-like defects, can be detected, but low-frequency abnormalities, such as color unevenness, may not be able to be detected as shown in FIGS. 7A and 7B. FIG. 7A shows a print PB on which an image defect of color unevenness forms, and FIG. 7B shows a state where the image formed on the print PB is segmented and a block of the image segmented.

Therefore, if an image is subjected to compression processing or segmentation processing, either high-frequency abnormalities or low-frequency abnormalities may not be able to be detected. A technique for increasing the inspection accuracy is known, but a mechanism capable of detecting both of the above-mentioned high-frequency abnormalities and low-frequency abnormalities has not heretofore been developed.

In contrast, according to the above embodiment, even if the image size is large, both the high-frequency and low-frequency abnormalities (image defects) can be appropriately detected.

The description in the above embodiment has been given of the case where by the learning of compressed and segmented images, two types of learning models, i.e., the second learning model and the third learning model, are generated as learning models suitable for detection of low-frequency abnormalities. However, the number of types of above-mentioned learning models generated is not limited to two and three or more types of learning models may be generated. Needless to say, a larger number of types of learning models provides a higher accuracy in the identification of an image defect. Alternatively, it is possible to generate the second learning model only as a learning model for detection of low-frequency abnormalities without generating the third learning model, in which case the identification accuracy decreases.

Furthermore, the description in the above embodiment has been given of the case where the first learning model is first used to perform inference and identification (S21 to S25 in FIG. 4), the second learning model is then subsequently used to perform inference and identification (S26 to S30), and the third learning model is then subsequently used to perform inference and identification (S31 to S35). However, in another embodiment, the inferrer 213 and the identifier 214 may perform these inference and identification processing tasks in parallel and, upon success of identification of the type of an image defect halfway, the system may end these processing tasks having been performed in parallel and proceed to next new processing. Thus, the processing time can be reduced.

Although the description in the above embodiment has been given of the case where the learning model generating device 10 is formed as a separate device from the type identification device 20, the type identification device 20 may have the above-described functions of the learning model generating device 10.

The present disclosure is not limited to the above embodiment and can be modified in various ways. Furthermore, the structure, configuration, and processing shown in the above embodiment with reference to FIGS. 1 to 7B are merely illustrative of the present disclosure and not intended to limit the present disclosure to the above particular structure, configuration, and processing.

While the present disclosure has been described in detail with reference to the embodiments thereof, it would be apparent to those skilled in the art the various changes and modifications may be made therein within the scope defined by the appended claims.

What is claimed is:

1. A learning model generating device capable of learning a data set containing image defect-containing training prints prepared for each type of image defect to generate a learning model, the learning model generating device comprising:
   a first image reading device that reads images of the training prints; and
   a first control device that includes a processor and functions, through the processor executing a first control program, as:
   a first segmenter that segments, on a predetermined first segmentation condition, each of the images of the training prints obtained by reading performed by the first image reading device;
   a learning model generator that learns segmented images obtained by segmentation performed by the first segmenter to generate a first learning model for use in inferring a type of an image defect; and
   a first compressor that compresses, on a predetermined first compression condition, each of the images of the training prints obtained by reading performed by the first image reading device,
   wherein the first segmenter segments, on a predetermined second segmentation condition, each of compressed images obtained by compression performed by the first compressor, and
   the learning model generator learns compressed and segmented images obtained by compression performed by the first compressor and segmentation performed by the first segmenter to generate a second learning model for use in inferring a type of an image defect, wherein the first compressor compresses each of the images of the training prints on a predetermined second compression condition different from the first compression condition, the first segmenter segments, on a predetermined third segmentation condition, each of compressed images of the training prints obtained by compression on the second compression condition performed by the first compressor, and the learning model generator learns compressed and segmented images obtained by compression on the second compression condition performed by the first compressor and segmentation performed by the first segmenter to generate a third learning model for use in inferring a type of an image defect.

2. A learning model generating device capable of learning a data set containing image defect-containing training prints prepared for each type of image defect to generate a learning model, the learning model generating device comprising:

a first image reading device that reads images of the training prints; and a first control device that includes a processor and functions, through the processor executing a first control program, as:

a first segmenter that segments, on a predetermined first segmentation condition, each of the images of the training prints obtained by reading performed by the first image reading device;

a learning model generator that learns segmented images obtained by segmentation performed by the first segmenter to generate a first learning model for use in inferring a type of an image defect; and a first compressor that compresses, on a predetermined first compression condition, each of the images of the training prints obtained by reading performed by the first image reading device, wherein the first segmenter segments, on a predetermined second segmentation condition, each of compressed images obtained by compression performed by the first compressor, and the learning model generator learns compressed and segmented images obtained by compression performed by the first compressor and segmentation performed by the first segmenter to generate a second learning model for use in inferring a type of an image defect, wherein the first compressor further compresses, on a predetermined third compression condition, each of the compressed images of the training prints obtained by previous compression, the first segmenter segments, on a predetermined third segmentation condition, each of compressed images of the training prints obtained by further compression performed by the first compressor, and the learning model generator learns compressed and segmented images obtained by the further compression performed by the first compressor and segmentation performed by the first segmenter to generate a third learning model for use in inferring a type of an image defect.

3. A type identification system comprising a learning model generating device capable of learning a data set containing image defect-containing training prints prepared for each type of image defect to generate a learning model and a type identification device using the first learning model and the second learning model both generated by the learning model generating device to identify a type of an image defect contained on a print to be inspected, the learning model generating device comprising:

a first image reading device that reads images of the training prints; and a first control device that includes a processor and functions, through the processor executing a first control program, as:

a first segmenter that segments, on a predetermined first segmentation condition, each of the images of the training prints obtained by reading performed by the first image reading device;

a learning model generator that learns segmented images obtained by segmentation performed by the first segmenter to generate a first learning model for use in inferring a type of an image defect; and a first compressor that compresses, on a predetermined first compression condition, each of the images of the training prints obtained by reading performed by the first image reading device, wherein the first segmenter segments, on a predetermined second segmentation condition, each of compressed images obtained by compression performed by the first compressor, and the learning model generator learns compressed and segmented images obtained by compression performed by the first compressor and segmentation performed by the first segmenter to generate a second learning model for use in inferring a type of an image defect, the type identification device comprising:

a second image reading device that reads an image of the print to be inspected; and a second control device that includes a processor and functions, through the processor executing a second control program, as:

a second segmenter that segments, on the same segmentation condition as the first segmentation condition, the image of the print to be inspected obtained by reading performed by the second image reading device;

an inferrer that uses the first learning model to infer a type of an image defect to which each of segmented images obtained by segmentation performed by the second segmenter applies; and a second compressor that compresses, on the same compression condition as the first compression condition, the image of the print to be inspected, wherein the second segmenter segments, on the same segmentation condition as the second segmentation condition, a compressed image obtained by compression performed by the second compressor, and the inferrer uses the second learning model to infer a type of an image defect to which each of compressed and segmented images obtained by compression performed by the second compressor and segmentation performed by the second segmenter applies.

4. The type identification system according to claim 3, wherein on the learning model generating device the first compressor compresses each of the images of the training prints on a predetermined second compression condition different from the first compression condition, the first segmenter segments, on a predetermined third segmentation condition, each of compressed images of the training prints obtained by compression on the second compression condition performed by the first compressor, and the learning model generator learns compressed and segmented images obtained by compression on the second compression condition performed by the first compressor and segmentation performed by the first segmenter to generate a third learning model for use in inferring a type of an image defect, and wherein on the type identification device the second compressor compresses, on the same compression condition as the second compression condition, the image of the print to be inspected, the second segmenter segments, on the same segmentation condition as the third segmentation condition, a compressed image obtained by compression on the second compression condition performed by the second compressor, and the inferrer uses the third learning model to infer a type of an image defect to which each of compressed and segmented images obtained by compression on the second compression condition performed by the second compressor and segmentation performed by the second segmenter applies.

5. The type identification system according to claim 3, wherein on the learning model generating device the first compressor further compresses, on a predetermined third compression condition, each of the compressed images of the training prints obtained by previous compression, the first segmenter segments, on a predetermined third segmentation condition, each of compressed images of the training prints obtained by further compression performed by the first compressor, and the learning model generator learns compressed and segmented images obtained by the further compression performed by the first compressor and segmentation performed by the first segmenter to generate a third learning model for use in inferring a type of an image defect, and wherein on the type identification device the second compressor further compresses, on the same compression condition as the third compression condition, the compressed image of the print to be inspected obtained by previous compression, the second segmenter segments, on the same segmentation condition as the third segmentation condition, a compressed image obtained by further compression performed by the second compressor, and the inferrer uses the third learning model to infer a type of an image defect to which each of compressed and segmented images obtained by the further compression performed by the second compressor and segmentation performed by the second segmenter applies.

6. The type identification system according to claim 3, wherein on the type identification device the second control device further functions, through the processor executing the second control program, as an identifier that determines, based on inference results of the inferrer, whether or not any image defect occurs on the print to be inspected, and, on occurrence of an image defect, identifies a type of the image defect, when using the first learning model to infer a type of an image defect to which each of the segmented images obtained by segmentation performed by the second segmenter applies, the inferrer outputs respective reliabilities of the inference results using the first learning model to the identifier, when using the second learning model to infer a type of an image defect to which each of the compressed and segmented images obtained by compression performed by the second compressor and segmentation performed by the second segmenter applies, the inferrer outputs respective reliabilities of the inference results using the second learning model to the identifier, (i) when determining that the reliabilities output from the inferrer include a reliability equal to or greater than a predetermined threshold value, the identifier adopts the inference result indicating the reliability to identify a type of an image defect contained on the print to be inspected, and (ii) when determining that the reliability output from the inferrer include no reliability equal to or greater than the threshold value, the identifer determines that the print to be inspected has no abnormality.

7. The type identification system according to claim 3, wherein on the type identification device the second control device further functions, through the processor executing the second control program, as an identifier that identifies, based on inference results of the inferrer, a type of an image defect contained on the print to be inspected from periodicity with which the segmented images indicated as having an image defect appear on the print to be inspected.

* * * * *